(12) United States Patent
Nakajima et al.

(10) Patent No.: US 10,534,914 B2
(45) Date of Patent: Jan. 14, 2020

(54) VULNERABILITY FINDING DEVICE, VULNERABILITY FINDING METHOD, AND VULNERABILITY FINDING PROGRAM

(71) Applicant: NIPPON TELEGRAPH AND TELEPHONE CORPORATION, Chiyoda-ku (JP)

(72) Inventors: Asuka Nakajima, Musashino (JP); Makoto Iwamura, Musashino (JP); Takeo Hariu, Musashino (JP)

(73) Assignee: NIPPON TELEGRAPH AND TELEPHONE CORPORATION, Chiyoda-ku (JP)

(*) Notice: Subject to any disclaimer, the term of this patent is extended or adjusted under 35 U.S.C. 154(b) by 113 days.

(21) Appl. No.: 15/504,116

(22) PCT Filed: Jul. 30, 2015

(86) PCT No.: PCT/JP2015/071721
§ 371 (c)(1),
(2) Date: Feb. 15, 2017

(87) PCT Pub. No.: WO2016/027641
PCT Pub. Date: Feb. 25, 2016

(65) Prior Publication Data
US 2017/0286692 A1     Oct. 5, 2017

(30) Foreign Application Priority Data

Aug. 20, 2014 (JP) ................ 2014-167678

(51) Int. Cl.
*G06F 21/57* (2013.01)
*G06F 21/56* (2013.01)
(52) U.S. Cl.
CPC .......... *G06F 21/577* (2013.01); *G06F 21/563* (2013.01); *G06F 2221/033* (2013.01)

(58) Field of Classification Search
CPC ................ G06F 21/577; G06F 21/563; G06F 2221/033; G06F 21/57
See application file for complete search history.

(56) References Cited

U.S. PATENT DOCUMENTS 6,282,698 B1      8/2001   Baker et al.
2009/0313700 A1*  12/2009  Horne .................. G06F 21/564
                                                    726/24

(Continued)

FOREIGN PATENT DOCUMENTS

CN     101425035 A     5/2009
JP     2009-98851 A    5/2009

OTHER PUBLICATIONS

Extended European Search Report dated Dec. 5, 2017 in Patent Application No. 15833502.6.

(Continued)

*Primary Examiner* — Maung T Lwin
*Assistant Examiner* — Suman Debnath
(74) *Attorney, Agent, or Firm* — Oblon, McClelland, Maier & Neustadt, L.L.P.

(57) ABSTRACT

A vulnerability finding device has a vulnerability extracting unit, a normalization processing unit, and a matching unit. The vulnerability extracting unit extracts a first program code corresponding to a vulnerable part of software. The normalization processing unit performs normalization of a parameter included in the first program code extracted by the vulnerability extracting unit and a second program code of software to be inspected for a vulnerable part. The matching unit performs matching between the first program code after the normalization and the second program code after the normalization, and detects a program code, which is a program code that is the same as or similar to the first program code, from the second program code.

5 Claims, 5 Drawing Sheets

(56) References Cited

U.S. PATENT DOCUMENTS

| | | | |
|---|---|---|---|
| 2010/0011441 A1* | 1/2010 | Christodorescu | G06F 21/53 726/24 |
| 2013/0185798 A1 | 7/2013 | Saunders et al. | |
| 2013/0227693 A1 | 8/2013 | Dewey | |
| 2013/0239219 A1 | 9/2013 | Siman | |
| 2015/0058984 A1* | 2/2015 | Shen | G06F 21/52 726/23 |
| 2015/0242626 A1* | 8/2015 | Wang | G06F 21/577 726/23 |

OTHER PUBLICATIONS

Debin Gao, et al., "BinHunt: Automatically Finding Semantic Differences in Binary Programs", Network and Parallel Computing, Springer International Publishing, XP47403742A, 2008, pp. 238-255.

International Search Report dated Oct. 27, 2015, in PCT/JP2015/071721, filed Jul. 30, 2015.

Jang et al., "ReDeBug: Finding Unpatched Code Clones in Entire OS Distributions", 2012 IEEE Symposium on Security and Privacy, 2012, pp. 48-62.

Saebjornsen et al., "Detecting Code Clones in Binary Executables", Proceedings of ISSTA '09, 2009, pp. 1-11.

Jing et al., "Proposal of Access Control System for Preventing Attacks Exploiting Vulnerability in Android WebView", IPSJ SIG Technical Report, vol. 2013-CSEC-60, No. 4, Apr. 15, 2013, 27 pages, with partial English translation.

Zhang et al., "MetaAware: Identifying Metamorphic Malware", Proceedings Twenty-Third Annual Computer Security Applications Conference, Dec. 10-14, 2007, pp. 411-420.

Ding et al., "Identifying Buffer Overflow Vulnerabilities based on Binary Code", Proceedings 2011 IEEE International Conference on Computer Science and Automation Engineering, vol. 4, Jun. 10-12, 2011, pp. 738-742.

Chinese Office Action for CN 201580042817.8, dated Oct. 19, 2018 (English translation provided).

* cited by examiner

VULNERABILITY FINDING DEVICE, VULNERABILITY FINDING METHOD, AND VULNERABILITY FINDING PROGRAM

FIELD

The present invention relates to a vulnerability finding device, a vulnerability finding method, and a vulnerability finding program.

BACKGROUND

Conventionally mentioned as one of factors of cyber attacks and infection with malware is the presence of vulnerability in software. Vulnerability is bugs that third parties are able to use in malicious acts, from bugs present in software. Thus, countermeasures, such as software developers finding and correcting vulnerability earlier than attackers, are becoming increasingly important. One of methods of finding vulnerability present in software is a method of using code clones. Code clones are similar or matching pieces of programs present in software. Code clones are usually generated by a software developer copying and pasting a source code into a program under development in order to realize particular functions, the source code being of another program having similar functions.

For example, if vulnerability is found in a source code of a copy source, a software developer not only needs to correct the source code of the copy source, but also needs to correct a source code of a copy destination. However, even if vulnerability is found in the source code of the copy source, unless the developer knows all of code clones of the found vulnerability, correction of vulnerability in software developed by use of the code clones is difficult. A method of finding vulnerability by use of code clones is a method of finding unknown vulnerability present in software to be inspected by finding a code clone of a part found to be vulnerable in the software to be inspected.

For example, described in Non-Patent Literature 1 is a method of using a technique for detecting a code clone included in a source code in finding vulnerability in software. Specifically, in this method, a source code of a vulnerable part is extracted from software found to have vulnerability in the past, and a code clone of the vulnerable part is found by performing matching between pieces of that source code with a source code of software to be inspected, the code clone included in the software to be inspected. In Non-Patent Literature 2, a technique for detecting code clones is described, the technique targeting a program code obtained from an executable file format.

CITATION LIST

Non-Patent Literature

Non-Patent Literature 1: J. Jang, A. Agrawal, and D. Brumley, "ReDeBug: Finding Unpatched Code Clones in Entire OS Distributions", In IEEE Symposium on Security and Privacy, 2012

Non-Patent Literature 2: Andreas Saebjoernsen, Jeremiah Willcok, Thomas Panas, Daniel Quinlan, and Zhendong Su, "Detecting Code Clones in Binary Executables", In Proceedings of ISSTA '09, 2009

SUMMARY

Technical Problem

However, a technique for finding vulnerability by use of code clones, with a program code of software being a target to be inspected, has not existed. In other words, for a software developer to find vulnerability of software by use of code clones, the software developer needs to know a source code of software to be inspected. Therefore, as to software, for which a source code is difficult to be obtained or used (for example, privately owned software, or software set with exclusive rights), finding vulnerability thereof has been difficult.

Techniques disclosed herein have been made in view of the above, and an object thereof is to provide a vulnerability finding device, a vulnerability finding method, and a vulnerability finding program, which enable vulnerability of software to be found without use of a source code.

Solution to Problem

To solve the problems described above and achieve the object, a vulnerability finding device, comprising: an extracting unit that extracts a first program code corresponding to a vulnerable part of software; a normalization unit that performs normalization of a parameter included in the first program code extracted by the extracting unit and a second program code of software to be inspected for a vulnerable part; and a detecting unit that performs matching between the first program code after the normalization and the second program code after the normalization, and detects a program code that is the same as or similar to the first program code, from the second program code.

Further, a vulnerability finding method executed by a vulnerability finding device, the vulnerability finding method including: an extracting process of extracting a first program code corresponding to a vulnerable part of software; a normalization process of performing normalization of a parameter included in the first program code extracted by the extracting process and a second program code of software to be inspected for a vulnerable part; and a detecting process of performing matching between the first program code after the normalization and the second program code after the normalization, and detecting a program code that is the same as or similar to the first program code, from the second program code.

Further, a vulnerability finding program for causing a computer to execute: an extracting step of extracting a first program code corresponding to a vulnerable part of software; a normalization step of performing normalization of a parameter included in the first program code extracted by the extracting step and a second program code of software to be inspected for a vulnerable part; and a detecting step of performing matching between the first program code after the normalization and the second program code after the normalization, and detecting a program code that is the same as or similar to the first program code, from the second program code.

Advantageous Effects of Invention

A vulnerability finding device, a vulnerability finding method, and a vulnerability finding program, which are disclosed by the present application, have an effect of enabling vulnerability of software to be found without use of a source code.

DESCRIPTION OF EMBODIMENTS

Hereinafter, embodiments of a vulnerability finding device, a vulnerability finding method, and a vulnerability finding program, which are disclosed by the present application, will be described in detail with reference to the drawings. The vulnerability finding device, the vulnerability finding method, and the vulnerability finding program disclosed by the present application are not limited by the following embodiments.

Figure 1:
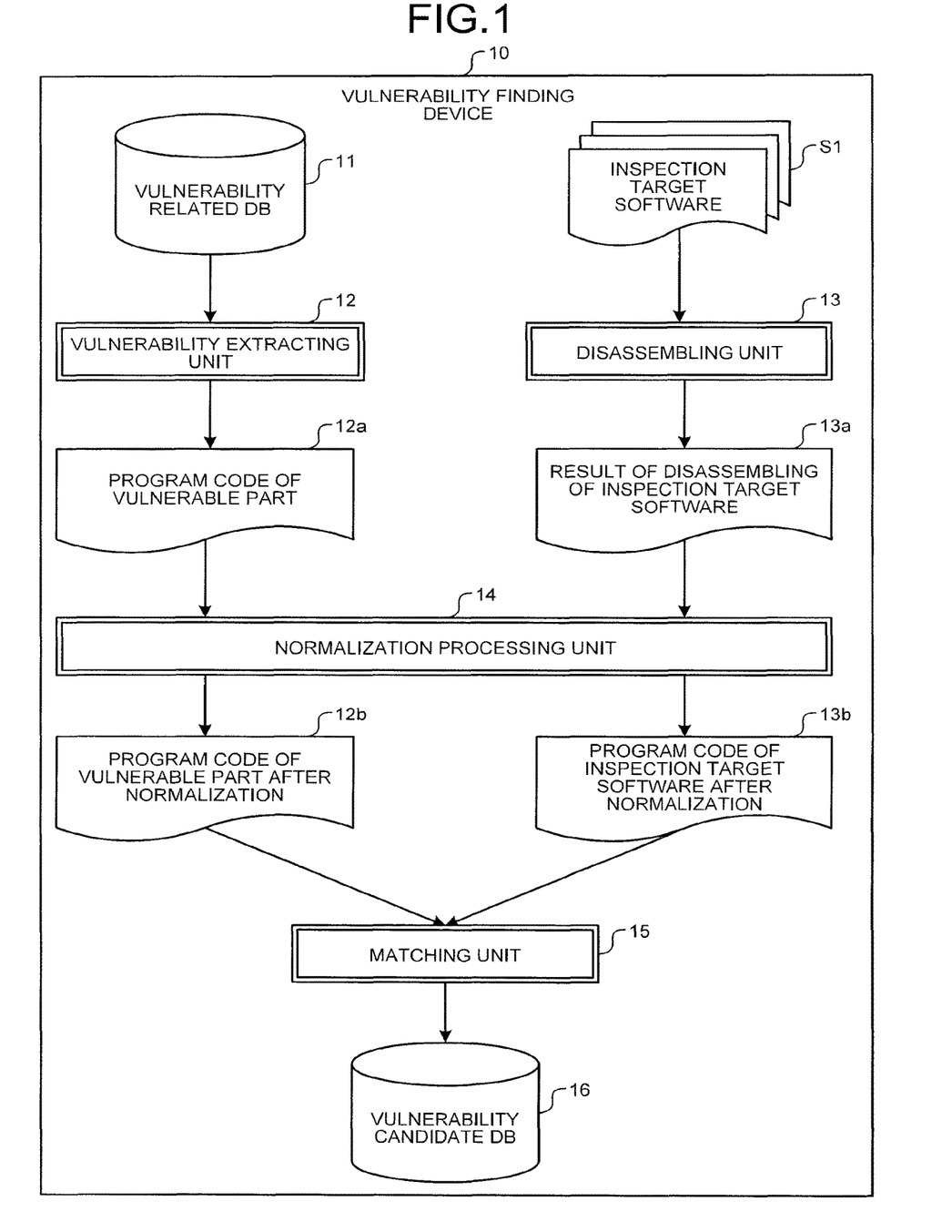
FIG. 1 is a block diagram illustrating a configuration of a vulnerability finding device.

First of all, a configuration of a vulnerability finding device 10 according to an embodiment disclosed by the present application will be described. FIG. 1 is a block diagram illustrating the configuration of the vulnerability finding device 10. The vulnerability finding device 10 finds vulnerability of software to be inspected (hereinafter, written as "inspection target software") by using a code clone in software. As illustrated in FIG. 1, the vulnerability finding device 10 has: a vulnerability related database (DB) 11; a vulnerability extracting unit 12; a disassembling unit 13; a normalization processing unit 14; a matching unit 15; and a vulnerability candidate DB 16. Each of these components is connected to be able to input and output signals and data unidirectionally or bidirectionally.

The vulnerability related DB 11 stores therein vulnerability related information. The vulnerability related information is, for example, attack verification codes, Common Vulnerabilities and Exposures (CVE), or the like, which will described later. The vulnerability extracting unit 12 obtains the vulnerability related information from the vulnerability related DB 11, and based on the vulnerability related information, extracts, from software, in which vulnerability is present, a program code corresponding to a part of that vulnerability.

The disassembling unit 13 disassembles inspection target software S1. The normalization processing unit 14 obtains a program code 12a of the vulnerable part from the vulnerability extracting unit 12. The normalization processing unit 14 obtains a result of the disassembling of the inspection target software S1 (assembly code) 13a from the disassembling unit 13. The normalization processing unit 14 performs normalization of the program code 12a of the vulnerable part and the result of the disassembling of the inspection target software S1.

The matching unit 15 performs matching (collation) between a program code 12b of the vulnerable part after the normalization and a program code 13b of the inspection target software S1 after the normalization, and finds a code clone of the program code 12b, the code clone included in the program code 13b. The matching unit 15 extracts, as an unknown vulnerability candidate, information on the code clone obtained as a result of the matching, and causes the information to be stored in the vulnerability candidate DB 16.

Next, operation of the vulnerability finding device 10 will be described.

Figure 2:
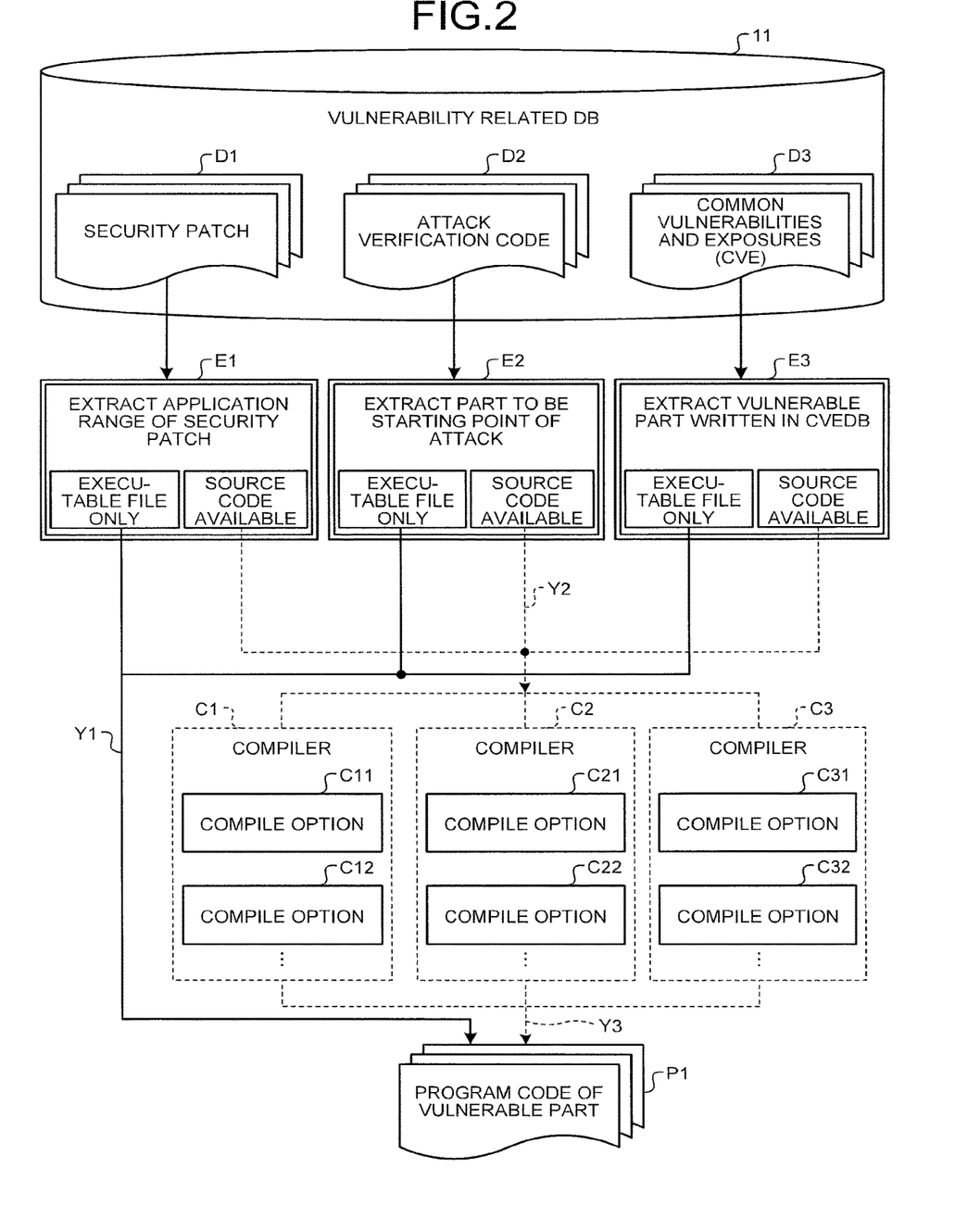
FIG. 2 is a diagram illustrating processing of a vulnerability extracting unit.

FIG. 2 is a diagram illustrating processing of the vulnerability extracting unit 12. As illustrated in FIG. 2, the vulnerability extracting unit 12 extracts a program code of a vulnerable part from software, in which vulnerability is present, by using, as the vulnerability related information, for example, security patches D1, attack verification codes D2, or Common Vulnerabilities and Exposures D3, which are publicly open. In this embodiment, the software, in which vulnerability is present, is software different from the inspection target software S1, but the software may be the same as the inspection target software S1. Further, the program code of the vulnerable part is extracted when, for example, presence of vulnerability is confirmed in the software.

Specifically, when the security patches D1 of the vulnerability related information are used, the vulnerability extracting unit 12 extracts a part of an application range of the security patches D1 with respect to the software, in which vulnerability is present, as the program code of the vulnerable part (E1). Further, when the attack verification codes D2 of the vulnerability related information are used, the vulnerability extracting unit 12 executes the attack verification codes D2 for the software, in which vulnerability is present, and extracts, as the program code of the vulnerable part, a part that becomes a starting point of attack (E2). Or, when the Common Vulnerabilities and Exposures D3 of the vulnerability related information are used, the vulnerability extracting unit 12 refers to a Common Vulnerabilities and Exposures Data Base (CVEDB) and extracts, as the program code of the vulnerable part, a part identified based on information on the software, in which vulnerability has been found (E3).

As described above, if a software developer is unable to obtain a source code of the software, in which vulnerability is present, and only an executable file in a binary format (program code) is present, as illustrated with a solid lined arrow Y1 in FIG. 2, without compilation being executed, a program code P1 of a vulnerable part is extracted. In contrast, if a source code of the software, in which vulnerability is present, is obtainable, the vulnerability extracting unit 12 comprehensively compiles the source codes by use of various compilers C1 to C3 when the vulnerability extracting unit 12 extracts the program code of the vulnerable part by using various types of vulnerability related information (broken lined arrow Y2). Thereafter, the vulnerability extracting unit 12 extracts the program code P1 of the vulnerable part from the software after each compilation (broken lined arrow Y3).

The vulnerability extracting unit 12 may use compile options C11, C12, . . . upon compilation with the compiler C1. Similarly, the vulnerability extracting unit 12 may use compile options C21, C22, . . . and compile options C31, C32, . . . upon compilation with the compilers C2 and C3, respectively.

Next, the disassembling unit 13 reads the inspection target software S1 and outputs a code that has been disassembled. The normalization processing unit 14 performs normalization processing of the program code of the vulnerable part that is a matching source and the disassembled program code of the inspection target software S1 that is a matching destination, and outputs the normalized program codes.

Figure 3:
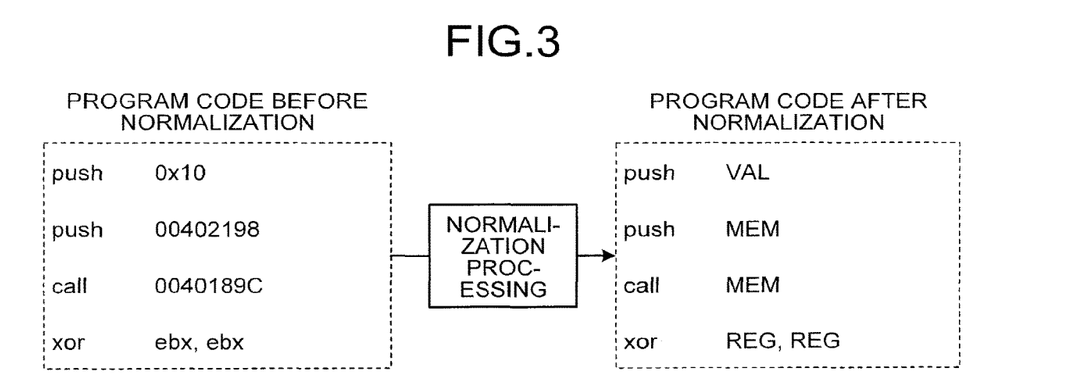
FIG. 3 is a diagram illustrating processing of a normalization processing unit.

FIG. 3 is a diagram illustrating processing of the normalization processing unit 14. Normalization processing is processing of performing abstraction of a part (for example, a type of a register, a values of a memory address of an access destination, or a variable parameter, such as an immediate value) that changes according to a compilation environment, from parts (parameters) included in program codes of both of the program code extracted from the vulnerable part of the software and the program code obtained by the disassembling of the inspection target software S1. As illustrated in FIG. 3, the normalization processing unit 14 converts the parts that change according to compilation environments to character strings representing only the attributes thereof. For example, the normalization processing unit 14 performs abstraction by converting respective values, "0x10", "00402198", "0040189C", and "ebx, ebx", in a program code into respective character strings, "VAL", "MEM", "MEM", and "REG, REG", respectively. Thereby, the normalization processing unit 14 enables accurate matching not affected by the environment in which the inspection target software S1 has been compiled.

In more detail, for software, the program codes generated may change even if the source codes are the same, depending on the environments in which the compilation has been performed (for example, the compilers or the compile options). Therefore, even if a code clone of a vulnerable part is present in the inspection target software S1 on the source code level, depending on the compilation environment, the above described parameter used by the program code may change. In this case, unless the vulnerability finding device 10 performs the above described normalization processing, the program code part that is rightfully the code clone may be misrecognized as a different program code part. As a result, vulnerability in the inspection target software S1 may be overlooked. Thus, by performing the above described normalization processing, the vulnerability finding device 10 increases adaptability to change in the compilation environment and realizes accurate code clone search with program codes without use of source codes.

In the normalization processing, a contracted instruction, which is information excluding the operand part from a machine instruction, may be used.

The matching unit 15 performs matching between the program code of the vulnerable part and the program code of the inspection target software S1, and extracts, as an unknown vulnerability candidate, information on a code clone found by the matching. The extracted information is stored in the vulnerability candidate DB 16. The information extracted and stored by the matching unit 15 may be the code clone itself, or attribute information of the code clone (for example, the position, the size, and the like).

Figure 4:
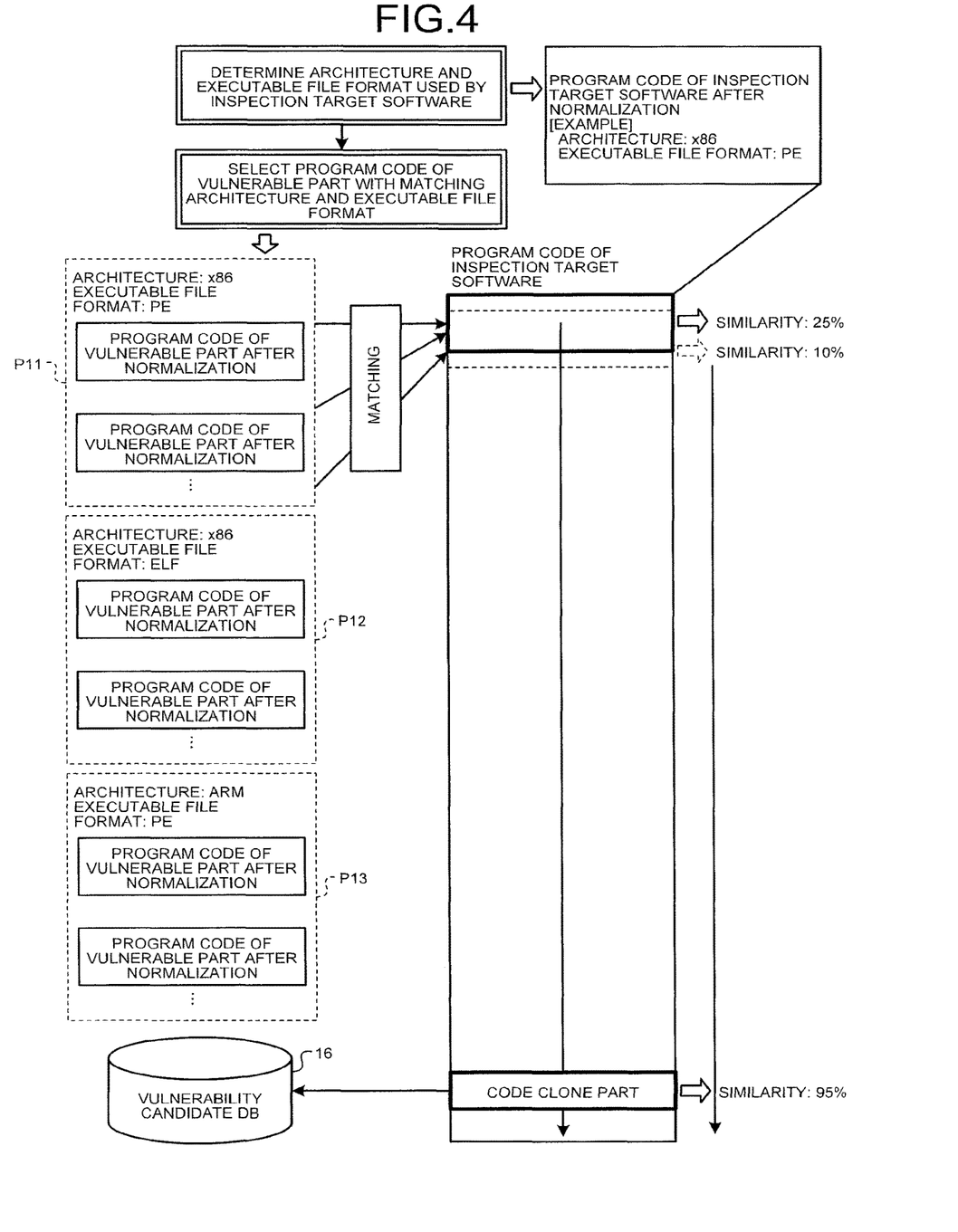
FIG. 4 is a diagram illustrating processing of a matching unit.

FIG. 4 is a diagram illustrating processing of the matching unit 15. As illustrated in FIG. 4, the matching unit 15 determines the architecture and the executable file format used by the inspection target software S1, and selects, as a matching source, only a program code of a vulnerable part with matching architecture and executable file format. The architecture is an instruction set architecture used by a central processing unit (CPU), and for example, is "x86" or "ARM". Further, the executable file format is a format of a file executable by the software on a calculator, and is for example, the "PE" format, or the "ELF" format.

For example, in an example illustrated in FIG. 4, the architecture used by the program code of the inspection target software S1 after normalization is "x86", and the executable file format is "PE". Therefore, a program code P13 with different architecture, "ARM", or a program code P12 with a different executable file format, "ELF", is not selected as a matching source, and a program code P11 having the architecture, "x86", and the executable file format, "PE", is selected. Thereby, program codes extracted from software of types different from that of the inspection target software S1 are excluded from targets of matching, and program codes to be subjected to matching are able to be narrowed down. Therefore, efficient matching with a shortened matching processing time is enabled.

The above described identity determination for architecture and executable file formats does not necessarily require a match for both, and only one of them may match.

After selecting a program code of a vulnerable part having the same architecture and executable file format as the inspection target, the matching unit 15 performs comprehensive matching between the program code of the inspection target software S1 and the program code of the vulnerable part. That is, the matching unit 15 performs the matching, as illustrated in FIG. 4, by shifting the position of a program code downwards per instruction, from the head to the tail of the program code of the inspection target software S1.

The matching unit 15 may calculate, upon the matching, a similarity indicating how similar the program code (matching source) of the vulnerable part and the program code (matching destination) of the inspection target software S1 are. In this case, the matching unit 15 determines that the program code part is a code clone part in the inspection target software S1, the program code part having a similarity, which is the highest and exceeds a predetermined threshold, the similarity obtained as a result of the matching. For example, the matching unit 15 calculates the similarities while shifting a matching target of the program code of the inspection target software S downward, by using N-perms. Specifically, the matching unit 15 calculates the similarity, like, the similarity being "25%" when one line out of four lines matches, or the similarity being "10%" when one line out of ten lines matches. If a program code part that is at a position where the calculated similarity is the highest (the position of "95%" in FIG. 4) exceeds the threshold (for example, 80% to 90%), the matching unit 15 then determines that the program code part is a code clone part.

Although the above mentioned N-perms is a similarity calculation technique using N series-by-instruction without ordering, since this technique is a widely known technique described in a reference, "Karim, M. E., Walenstein, A., Lakhotia, A., and Parida, L., "Malware Phylogeny Generation using Permutations of Code", European Research Journal of Computer Virology 1, 1-2 (November, 2005) 13-23", detailed description thereof will be omitted. Although a program code part with a similarity being the highest and exceeding the predetermined threshold has been described as an example with respect to the conditions of the similarity, not being limited to this example, any other conditions may be adopted, like a program code part satisfying any one of these conditions, a program code part having a similarity within the top three similarities, or the like.

As described above, the vulnerability finding device 10 is able to further reduce misdetection of code clones by using the above described similarity upon matching between a program code of a vulnerable part and the program code of the inspection target software S1. As a result, accuracy of finding vulnerability is improved.

As described above, the vulnerability finding device 10 has the vulnerability extracting unit 12, the normalization processing unit 14, and the matching unit 15. The vulnerability extracting unit 12 extracts a first program code corresponding to a vulnerable part of software. The normalization processing unit 14 performs normalization of a parameter that differs according to the compilation environment, the parameter included in the first program code extracted by the vulnerability extracting unit 12 and in a second program code of software to be inspected for a vulnerable part. The matching unit 15 performs matching between the first program code after the normalization and the second program code after the normalization, and detects, as an unknown vulnerability candidate, a code clone, which is a program code that is the same as or similar to the first program code, from the second program code.

Further, in the vulnerability finding device 10, upon the matching, the matching unit 15 may perform matching between: the first program code after the normalization, the first program code having the same architecture and executable file format as those of the software to be inspected; and the second program code after the normalization. Furthermore, the vulnerability extracting unit 12 may compile a source code of software having the first program code, and extract the first program code corresponding to the vulnerable part of the software from the program code obtained by the compilation. Moreover, the matching unit 15 may calculate a similarity between the first program code and the second program code, and detect a program code having the similarity, which is the highest and exceeds a predetermined value, from the second program code, as the above described same or similar program code. In addition, the normalization processing unit 14 may perform normalization of a parameter, as the above described parameter, the parameter changing according to the compilation environment, from parameters included in both of program codes of the first program code and the second program code.

As described above, the vulnerability finding device 10 is able to find vulnerability generated by a code clone in the inspection target software S1 without using a source code of the inspection target software S1, by directly comparing program codes. Therefore, finding vulnerability in software, for which a source code is difficult to be obtained or used (for example, privately owned software, or software set with exclusive rights), is also enabled.

(Vulnerability Finding Program)

Figure 5:
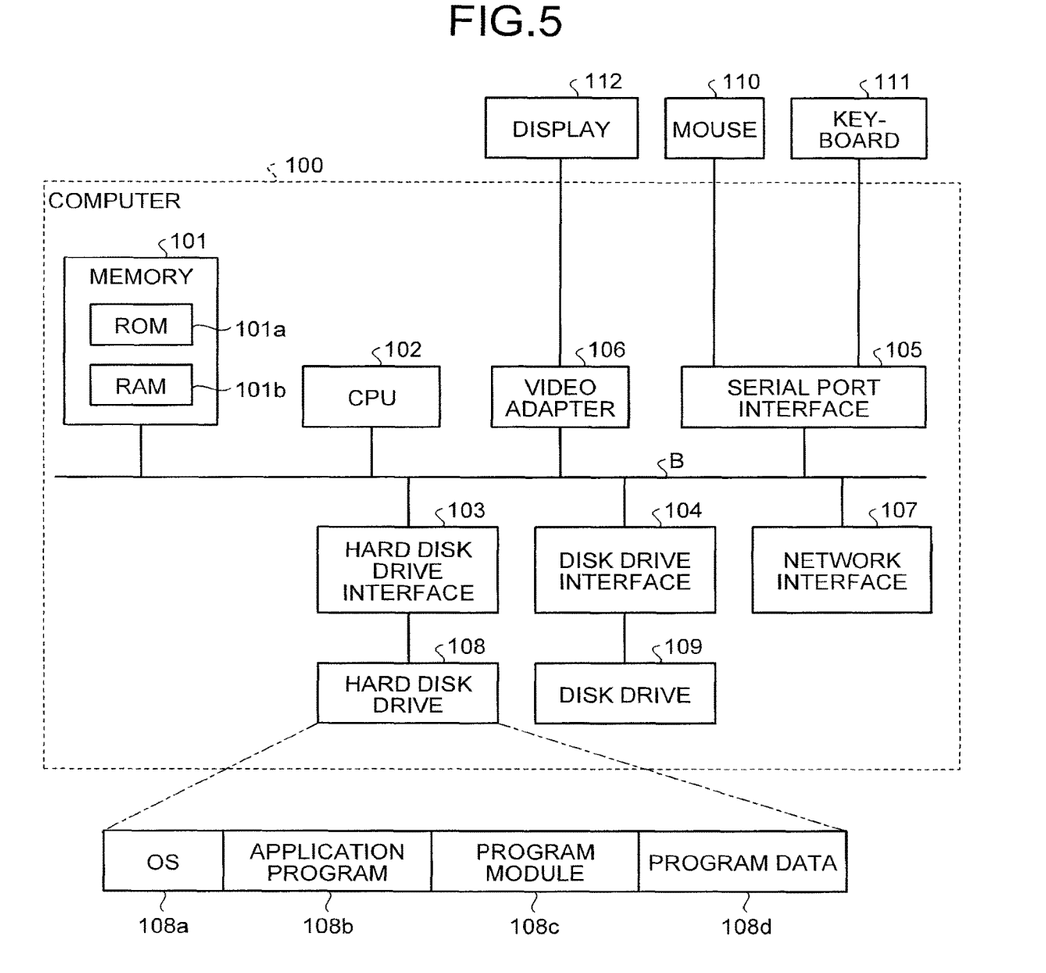
FIG. 5 is a diagram illustrating that information processing by a vulnerability finding program is tangibly realized by use of a computer.

FIG. 5 is a diagram illustrating that information processing by the vulnerability finding program is tangibly realized by use of a computer 100. As illustrated in FIG. 5, a computer 100 has, for example, a memory 101, a central processing unit (CPU) 102, a hard disk drive interface 103, a disk drive interface 104, a serial port interface 105, a video adapter 106, and a network interface 107; and these units are connected to one another via a bus B.

The memory 101 includes, as illustrated in FIG. 5, a read only memory (ROM) 101a and a random access memory (RAM) 101b. The ROM 101a stores therein, for example, a boot program, such as Basic Input Output System (BIOS). The hard disk drive interface 103 is, as illustrated in FIG. 5, connected to a hard disk drive 108. The disk drive interface 104 is, as illustrated in FIG. 5, connected to a disk drive 109. For example, an attachable and detachable storage medium, such as a magnetic disk or an optical disk, is inserted in the disk drive 109. The serial port interface 105 is, as illustrated in FIG. 5, connected to, for example, a mouse 110 and a keyboard 111. The video adapter 106 is, as illustrated in FIG. 5, connected to, for example, a display 112.

As illustrated in FIG. 5, the hard disk drive 108 stores therein, for example, an operating system (OS) 108a, an application program 108b, a program module 108c, program data 108d, vulnerability related information, and code clone information (vulnerability candidate). That is, the vulnerability finding program according to the disclosed technique is stored, as the program module 108c, in which commands executed by the computer 100 are described, in the hard disk drive 108, for example. Specifically, the program module 108c, in which various sequences are described, is stored in the hard disk drive 108, the various sequences for executing information processing similar to that of each of the vulnerability extracting unit 12, the disassembling unit 13, the normalization processing unit 14, and the matching unit 15 described above in the embodiment. Further, data used in the information processing by the vulnerability finding program are stored as the program data 108d in, for example, the hard disk drive 108. The CPU 102 loads the program module 108c and the program data 108d stored in the hard disk drive 108 into the RAM 101b as necessary, and executes the above described various sequences.

The program module 108c and the program data 108d related to the vulnerability finding program are not necessarily stored in the hard disk drive 108, and for example, may be stored in an attachable and detachable storage medium and read out by the CPU 102 via the disk drive 109 or the like. Or, the program module 108c or the program data 108d related to the vulnerability finding program may be stored in another computer connected via a network (local area network (LAN), wide area network (WAN), or the like) and read out by the CPU 102 via the network interface 107.

In the above described embodiment, the disassembling unit 13 disassembles the inspection target software S1, but if the inspection target software S1 is described in a high level language, decompilation may be performed. On the contrary, in FIG. 2, the compilers C1 to C3 may be assemblers, and if a source code of software, in which vulnerability is present, is obtainable, the source code may be assembled.

Further, each of the above described components of the vulnerability finding device 10 is not necessarily physically configured as illustrated in the drawings. That is, specific modes of distribution and integration of the respective devices are not limited to those illustrated in the drawings, and depending on various loads, use situations and the like, all or some of the devices may be configured to be functionally or physically distributed or integrated in arbitrary units. For example, at least one of: the vulnerability extracting unit 12 and normalization processing unit 14; and the disassembling unit 13 and normalization processing unit 14, may be integrated into one component. On the contrary, the matching unit 15 may be distributed into a unit that executes matching processing, a unit that detects a code clone, and a unit that determines identity of the used architecture and executable file format. Furthermore, the hard disk drive 108 may be connected via a network or cable, as an external device of the vulnerability finding device 10.

REFERENCE SIGNS LIST

10 VULNERABILITY FINDING DEVICE
11 VULNERABILITY RELATED DB
12 VULNERABILITY EXTRACTING UNIT
13 DISASSEMBLING UNIT
14 NORMALIZATION PROCESSING UNIT
15 MATCHING UNIT
16 VULNERABILITY CANDIDATE DB
100 COMPUTER
101 MEMORY
101a ROM
101b RAM
102 CPU
103 HARD DISK DRIVE INTERFACE
104 DISK DRIVE INTERFACE
105 SERIAL PORT INTERFACE
106 VIDEO ADAPTER

107 NETWORK INTERFACE
108 HARD DISK DRIVE
108a OS
108b APPLICATION PROGRAM
108c PROGRAM MODULE
108d PROGRAM DATA
109 DISK DRIVE
110 MOUSE
111 KEYBOARD
112 DISPLAY
C1, C2, C3 COMPILER
C11, C12, . . . ; C21, C22, . . . ; C31, C32, . . . COMPILE OPTION
D1 SECURITY PATCH
D2 ATTACK VERIFICATION CODE
D3 COMMON VULNERABILITIES AND EXPOSURES
P1 PROGRAM CODE OF VULNERABLE PART
P11, P12, P13 PROGRAM CODE
S1 INSPECTION TARGET SOFTWARE

The invention claimed is:

1. A vulnerability finding device, comprising:
processing circuitry configured to
obtain a source code that corresponds to a first program code;
compile the source code to obtain the first program code;
extract the first program code that is an executable code corresponding to a vulnerable part of software;
abstract parameters of the first program code and a second program code that are variable with different compilation environments to obtain a first normalized code and a second normalized code, the second program code being another executable code;
compare similarity levels between various parts of the second normalized code and the first normalized code by shifting the first normalized code downwards from a top of the second normalized program code to a bottom of the second normalized program code;
identify one or more vulnerability candidate parts of the second program code according to the compared similarity levels; and
determine a part of the second program code that corresponds to one of the compared similarity levels greater than a predetermined threshold as a vulnerability candidate part.

2. The vulnerability finding device according to claim 1, wherein the processing circuitry is further configured to
select the first program code that is consistent with an architecture or executable file format of the second program code.

3. The vulnerability finding device according to claim 1, wherein the processing circuitry is further configured to
extract, from publicly available vulnerability information, the first program code,
wherein the first program code includes a part of a program that corresponds to a target of a security patch to vulnerability, a starting point of an attack to vulnerability, or common vulnerabilities and exposures.

4. A vulnerability finding method executed by a vulnerability finding device, the vulnerability finding method comprising:
obtaining a source code that corresponds to a first program code;
compiling the source code to obtain the first program code;
extracting the first program code that is an executable code corresponding to a vulnerable part of software;
abstracting parameters of the first program code and a second program code that are variable with different compilation environments to obtain a first normalized code and a second normalized code, the second program code being another executable code;
comparing, by processing circuitry of the vulnerability finding device, similarity levels between various parts of the second normalized code and the first normalized code by shifting the first normalized code downwards from a top of the second normalized program code to a bottom of the second normalized program code;
identifying, by the processing circuitry of the vulnerability finding device, one or more vulnerability candidate parts of the second program code according to the compared similarity levels; and
determining a part of the second program code that corresponds to one of the compared similarity levels greater than a predetermined threshold as a vulnerability candidate part.

5. A non-transitory computer readable storage medium having stored therein a vulnerability finding program that, when being executed by a computer, causes the computer to perform a process comprising:
obtaining a source code that corresponds to a first program code;
compiling the source code to obtain the first program code;
extracting the first program code that is an executable code corresponding to a vulnerable part of software;
abstracting parameters of the first program code and a second program code that are variable with different compilation environments to obtain a first normalized code and a second normalized code, the second program code being another executable code;
comparing similarity levels between various parts of the second normalized code and the first normalized code by shifting the first normalized code downwards from a top of the second normalized program code to a bottom of the second normalized program code;
identifying one or more vulnerability candidate parts of the second program code according to the compared similarity levels; and
determining a part of the second program code that corresponds to one of the compared similarity levels greater than a predetermined threshold as a vulnerability candidate part.

* * * * *